United States Patent
Lei et al.

(10) Patent No.: US 11,886,374 B2
(45) Date of Patent: Jan. 30, 2024

(54) SYSTEM COMMUNICATION TECHNIQUE OVER PCIE® (PERIPHERAL COMPONENT INTERCONNECT EXPRESS) LINK

(71) Applicant: MAXLINEAR, INC., Carlsbad, CA (US)

(72) Inventors: Chuanhua Lei, Singapore (SG); Jiaxiang Shi, Singapore (SG)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 17/594,828

(22) PCT Filed: Mar. 27, 2020

(86) PCT No.: PCT/US2020/025112
§ 371 (c)(1),
(2) Date: Oct. 29, 2021

(87) PCT Pub. No.: WO2020/222951
PCT Pub. Date: Nov. 5, 2020

(65) Prior Publication Data
US 2022/0214992 A1    Jul. 7, 2022

Related U.S. Application Data

(60) Provisional application No. 62/839,984, filed on Apr. 29, 2019.

(51) Int. Cl.
G06F 13/42    (2006.01)
G06F 11/07    (2006.01)
G06F 13/10    (2006.01)

(52) U.S. Cl.
CPC ...... *G06F 13/4221* (2013.01); *G06F 11/0745* (2013.01); *G06F 11/0769* (2013.01); *G06F 13/102* (2013.01); *G06F 2213/0026* (2013.01)

(58) Field of Classification Search
CPC ............ G06F 13/4221; G06F 11/0745; G06F 11/0769; G06F 2213/0026; G06F 13/102
See application file for complete search history.

(56) References Cited

U.S. PATENT DOCUMENTS

2006/0288098 A1* 12/2006 Singh .............. G06F 11/085
709/224
2009/0083760 A1* 3/2009 Slaight .............. G06F 13/4022
719/313

(Continued)

FOREIGN PATENT DOCUMENTS

KR    10-1832797 B1    4/2018
WO    2020222951 A1    11/2020

OTHER PUBLICATIONS

PCI Express Base Specification Revision 1.1, PCI-SIG, p. 74, Mar. 28, 2005. (Year: 2005).*

(Continued)

*Primary Examiner* — Glenn A. Auve
(74) *Attorney, Agent, or Firm* — Buchalter; Jason W. Croft

(57) ABSTRACT

Examples relate to apparatuses, devices, methods and computer programs for a Root Complex (RC) and/or for an Endpoint (EP) of a PCIe (Peripheral Component Interconnect express) system, to a PCIe system and to a gateway device comprising a PCIe system. An apparatus configured for a RC of a PCIe system comprises a memory and one or more processors, which are configured to generate a PCIe VDM (Vendor Defined Message) message for an EP of the PCIe system.

12 Claims, 5 Drawing Sheets

(56) References Cited

U.S. PATENT DOCUMENTS

| | | |
|---|---|---|
| 2014/0237153 A1 | 8/2014 | Glaser et al. |
| 2014/0281070 A1 | 9/2014 | Natu et al. |
| 2017/0068626 A1 | 3/2017 | Lais et al. |
| 2017/0068637 A1* | 3/2017 | Lais .................... G06F 13/4022 |
| 2017/0070363 A1* | 3/2017 | Watkins .................. G06F 13/00 |
| 2017/0269943 A1 | 9/2017 | Kumar et al. |
| 2019/0235612 A1* | 8/2019 | Li ......................... G06F 1/3215 |
| 2020/0042692 A1* | 2/2020 | Bolen ..................... G06F 21/44 |

OTHER PUBLICATIONS

International Search Report and Written Opinion in PCT/US2020/025112 dated Jul. 10, 2020.

* cited by examiner

| | +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|---|
| | 7|6|5|4|3|2|1|0 | 7|6|5|4|3|2|1|0 | 7|6|5|4|3|2|1|0 | 7|6|5|4|3|2|1|0 |
| Byte 0 > | Fmt 0x1 | | | Type | | | R | TC | | | R | Attr | R | TH | TD | EP | Attr | | AT | | Length | | | | | | | | | | | |
| Byte 4 > | Requester ID | | | | | | | | | | | | | | | Tag | | | | | | | | Message Code--Vendor_Defined | | | | | | | |
| Byte 8 > | Bus Number | | | | | | | | Device Number Reserved | | | | | | | Function Number | | | | Vendor ID | | | | | | | | | | | |
| Byte 12 > | {For Vendor Definition} | | | | | | | | | | | | | | | | | | | | | | | | | | | | | | |

Fig. 4a

| [31:24]: RC→EP | [23:16]: Buffer status | [15:8]: Data path status | [7:0]: Reset Communication |
|---|---|---|---|
| [31:28]: EC to EP Interrupt encoding | 16: TX buffer health level | [15:12]: RC side status encoding: LAN/ WiFi/Voice/Video port status | [7:4]: RC side reset status: BM/CQM/PP/ Host in reset |
| [27:24]: RC to EP error encoding, including dying gasp here? | 17: TX buffer over threshold | [15:12]: EP side status encoding: linkup; link stable; link speed encoding | [3:0]: EP side reset status: DMA/MAC (DFE)/AFE/LD |
| | 18: RX buffer health level | | |
| | 19: RX buffer over threshold | | |
| | [23:20] for descriptor buffer status | | |

SYSTEM COMMUNICATION TECHNIQUE OVER PCIE® (PERIPHERAL COMPONENT INTERCONNECT EXPRESS) LINK

FIELD

The present disclosure is directed to improvements in PCIe® (Peripheral Component Interconnect express) messaging, and more specifically to employing VDM (Vendor Defined Message) messaging to facilitate two-way messaging between sub-systems of a WAN (Wide-Area Network).

BACKGROUND

PCIe® is a communication standard that is used to provide communication between devices of a computer system, for example between devices of a personal computer system, or between devices of an embedded system, such as a gateway device. For example, in gateway devices, PCIe® may be used to provide communication between a network processing SoC (System on Chip) and a WAN (Wide-Area Network) technology front end SoC.

BRIEF DESCRIPTION OF THE FIGURES

Some examples of apparatuses and/or methods will be described in the following by way of example only, and with reference to the accompanying figures, in which

FIG. 4a shows a schematic diagram of an example of a header for VDM messages; and FIG. 4b shows a table of events and messages that can be communicated via enhanced VDM messaging.

DETAILED DESCRIPTION

Figure 1A:
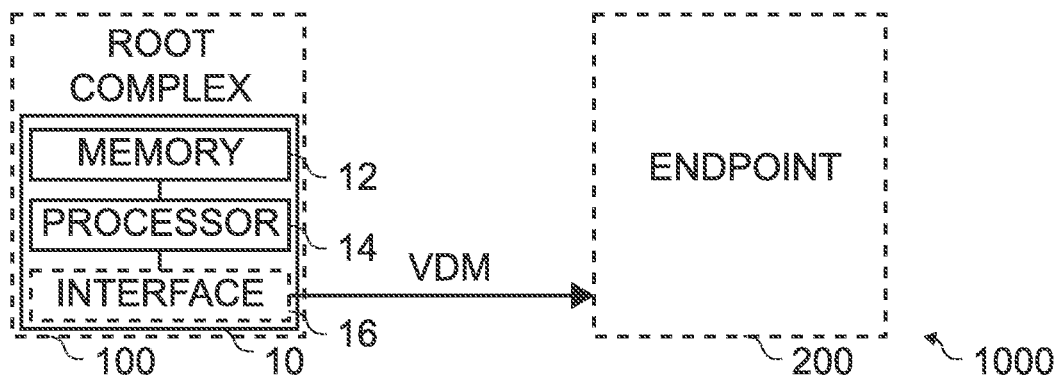
FIGS. 1a to 1c show block diagrams of examples of an apparatus configured for a Root Complex (RC) of a PCIe® (Peripheral Component Interconnect express) system.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

The AnyWAN system architecture is becoming more popular and accepted in the telecommunications industry for the latest generation of home gateway solutions. Two sub-systems of this architecture are the networking processing SoC (System on Chip) and WAN (Wide-Area Network) technology front end SoC. Industry standard-based protocols such as PCIe® links can be used to interconnect the two SoC sub-systems. In many scenarios, the data path performance and efficiency are well addressed over this standard link. However, challenges can be faced on non-data system communications, as the standard links do not comprise a two-way communication mechanism either via message or signaling, and the two SoC sub systems run concurrently without any means to inform one another of critical system events. Additionally, as discussed in greater detail below, examples and techniques discussed herein can be employed in other systems and apparatuses employing PCIe® system architecture.

Various examples discussed herein can create and/or employ a two-way communication mechanism with in-band messaging, to address various system communication goals such as the reporting of a local system going to reset, loss of power, highly unstable WAN speed and/or loss of link, etc. In various examples, side band signals over standard connections (such as PCIe® (Peripheral Component Interconnect express)) can be omitted, and system robustness can be greatly improved, due to timely communication of sub system status between subsystems.

In existing systems, all standard based PCIe® messaging are in-band; however, the standard defined in-band message protocol is limited in what direction various messaging can be sent, for example: (1) Interrupt message: only from EP (Endpoint) to RC (Root Complex); (2) Error report message: only from EP to RC; and (3) VDM (Vendor Defined Message): only EP to RC (wherein in existing systems the format and content of the payload is undefined). Each of these three messages (and others) are unidirectional messaging and have a limited scope of application.

Various examples discussed herein can employ an in-band VDM with expanded application scope, which can define content format to address the two-way communication. For EP to RC, examples discussed herein can employ a message format created for VDM, and VDM usage can be expanded. Additionally, for RC to EP, examples discussed herein can employ a message format created for VDM, and can add application(s) on the VDM mechanism.

In the PCIe® base specification, the Vendor Defined Message (VDM) is an optional feature can be used for system communication over a PCIe® link. However, the message format, usage and generation mechanism are not defined in the PCIe® specification.

Various examples discussed herein can employ VDMs that are expanded compared to existing systems, via defining a system communication message format and allowing two-way messaging over the PCIe® link to effectively transport system events information.

With the expanded VDM definition employed by various examples, there is a defined in-band message format that can be used (e.g., sent or received, depending on the sub-system/example) to inform the other sub-system of the PCIe® link in a timely manner, hence each sub-system (e.g., EP or RC) can handle events such as system reset, power loss, link loss, etc. in a managed way. In contrast, in existing systems not employing techniques discussed herein, either both sub-systems have no knowledge of such system events, or sideband signaling has to be employed to communicate (however, in a socket and plug-in card system construction, such sideband signaling is not possible).

Figure 1B:
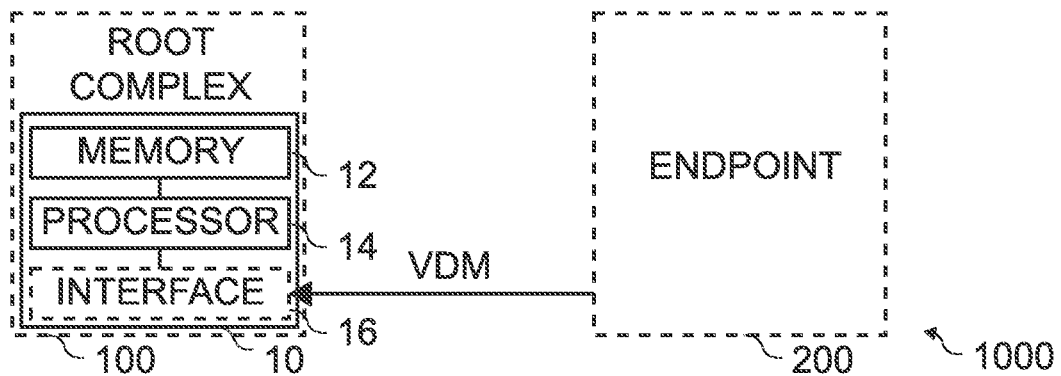
Figure 1C:
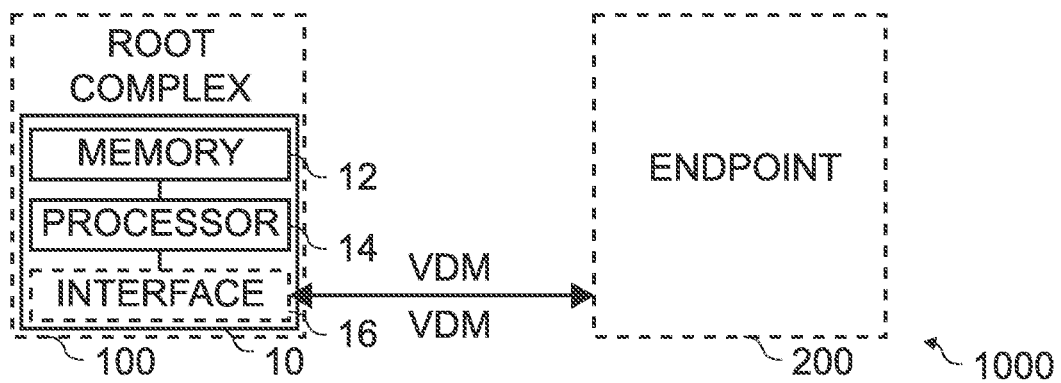

FIGS. 1a to 1c show block diagrams of examples of an apparatus 10 configured for a Root Complex (RC) 100 of a PCIe® (Peripheral Component Interconnect express) system 1000.

FIGS. 1a to 1c further show block diagrams of examples of a device 10 configured for the RC 100 of the PCIe® system 1000. The components of the device 10 are defined as component means, which correspond to the respective structural components of the apparatus 10. FIGS. 1a to 1c further show the RC 100 comprising the respective apparatus 10. The apparatus 10 comprises a memory 12 (i.e. memory means) and one or more processors 14 (i.e. processing means). Optionally, the apparatus 10 further comprises an interface 16 (i.e. communication means), e.g. an interface for communicating with the RC, and/or for communicating with an EP via the RC. The one or more processors are coupled to the memory 12 and/or to the interface 16. FIGS. 1a to 1e further show the PCIe® system comprising the RC 100 (with the apparatus 10) and the EP 100. For example, the PCIe® system may be a PCIe® system of a gateway device, such as a modem or router, e.g. an xDSL (x Digital Subscriber Line, with x denoting different DSL standards or implementations) modem or router, a xPON (x Passive Optical Network, with x denoting different PON standards or implementations, a cable modem or router, a DOCSIS (Data Over Cable Service Interface Specification, a cable communication standard) modem or router etc. Examples further provide a gateway device comprising the PCIe® system with the RC (with the apparatus 10) and one or more EPs (e.g. with an apparatus 20 as introduced in connection with FIGS. 2a to 2c). The gateway device may further comprise a network processor and/or a video processor, which may be linked to the EPs providing communication paths via the RC and the PCIe® system.

Various examples of the present disclosure relate to a root complex (RC) of a PCIe® system, to one or more endpoints (EPs) that are coupled to the RC. In general, the root complex of a PCIe® system connects the processor and memory subsystem of a computer system (e.g. of an embedded computer system, such as a gateway) to one or more PCIe® endpoints (e.g. via one or more PCIe® switches. Furthermore, the PCIe® endpoints may be connected to each other via the root complex. In the PCIe® specification (e.g. PCIe® specification 3.0 and later), the concept of Vendor Defined Messages is introduced, which may be used, in other systems, only by the endpoints to transmit a message to the root complex. The reverse direction, however, is not supported by the PCIe® VDM message defined in PCIe® 3.0 and later. Examples of the present disclosure extend the versatility of the PCIe® VDM messages, by extending the message format to support messaging from the RC to the one or more EPs of the PCIe® system.

FIG. 1a shows an example of an apparatus configured for the RC of the PCIe® system 1000. The one or more processors 14 of the apparatus 10 of FIG. 1a are configured to generate a PCIe® VDM message for an EP Endpoint 200 of the PCIe® system. The one or more processors may be configured to transmit the generated PCIe® VDM message to the EP, e.g. via the RC and/or the PCIe® system.

Previously, as e.g. defined in the PCIe® 3.0 standard, VDM were (only) generated by the EPs, for communication from the EPs to the RC. In examples, however, VDM may also be generated by the RC, e.g. to convey information about a status of the RC, or to trigger an interrupt at the respective EP. For example, the PCIe® VDM message may retain the header format defined in the PCIe® specification (shown in FIG. 4a), and use the fourth group of bytes (bytes 12 to 15) for the message content being exchanged between the RC and the EP (see FIGS. 4a to 4b). For example, some bit fields of the vendor defined portion of the header may only be used either by RC or EP, and/or some bit fields of the vendor defined portion of the header may only be used by both RC and EP.

For example, the PCIe® VDM message may comprise an interrupt trigger for the EP of the PCIe® system. In general, an interrupt trigger is an information that causes the recipient of the interrupt to trigger an interrupt, i.e. a switch of the context of the processor of the recipient to a context for handling the interrupt. For example, interrupts are often used to notify the recipient of an arrival of a message, to cause the recipient to receive or read out the message from a buffer. For example, as shown in FIG. 4b, in bits [31:28] of the fourth group of bytes, RC to EP interrupt encoding may be included in the PCIe® VDM message. For example, the interrupt trigger for the EP may be suitable for notifying the EP, e.g. a System on Chip (SoC) of the EP, of the arrival of a message. In some examples, the one or more processors may be configured to generate the interrupt trigger for the EP, e.g. based on a status of the RC.

Alternatively or additionally, the PCIe® VDM message may be used to inform the EP of errors that are present at the RC. For example, when errors are present at the RC, the EPs may hold off from transmitting data to the RC, until the error has been resolved (e.g. by a reset of the RC). Accordingly, the PCIe® VDM message may comprise information on an error at the RC. For example, as shown in FIG. 4b, in bits [27:24] of the fourth group of bytes, RC to EP error encoding may be included in the PCIe® VDM message. For example, the error at the RC may optionally comprise a dying gasp indication, i.e. the last message that is transmitted by the RC before the RC is shut down or reset. Such a "dying gasp" indication may indicate a fatal error at the RC, which might only by fixable by resetting the RC. Accordingly, the PCIe® VDM message may comprise an indication of a fatal error at the RC of the PCIe® system.

In some examples, the PCIe® VDM message may comprise information on a reset status at the RC. For example, the reset status at the RC may reflect the reset status of one or more components of the RC or of the PCIe® system in general. For example, the reset status may indicate whether (e.g. that) a buffer manager, a central queue manager, a packet processor and/or a host of the PCIe® system or root complex is in a reset state (or not in a reset state). For example, the PCIe® VDM message may comprise a notification that the RC of the PCIe® system is resetting. For example, each of the different components named above may be represented by a bit of the information on a reset status, with 1 (or 0) indicating that the respective component is in a reset state, and with 0 (or 1) indicating that the respective component is not in a reset state. Accordingly, as shown in FIG. 4b, in bits [7:0] of the fourth group of bytes, Reset Communication may be included, which may comprise, at bits [7:4], the RC side reset status: BM (Buffer Manager)/CQM (Central Queue Manager)/PP (Packet Processor)/Host in reset. In various embodiments, the one or more processors may be configured to determine the reset status at the RC, e.g. by processing the reset status of the one or more components.

Another type of status information that may be of interest, for instance in a gateway device, may be the status of one or more networking subsystems, and thus data paths, being connected to the PCIe® system. Accordingly, the PCIe® VDM message may comprise information on a status of at least one data path. For example, the at least one data path may relate to at least one networking technology being supported by the gateway device comprising the PCIe® system, e.g. at least one network technology being accessible via the PCIe® system. For example, as further shown in FIG. 4b, in bits [15:12] of the fourth group of bytes, RC side status encoding may be in included, which may relate to the status of the data paths known to the RC. For example, the information on the status of the at least one data path may comprise information on at least one of a LAN (Local Area Network) data path of the gateway device, of a WiFi (Wireless Fidelity)/WLAN (Wireless Local Area Network) data path of the gateway device, a voice port of the gateway device and of a status of the a video port of the gateway device. Again, one bit may be used per data path of the gateway device to represent the information on the status of the at least one data path.

Another type of status information that may be of interest, for instance in a gateway device, may be the buffer status, e.g. of a TX (Transmitter) buffer and/or of an RX (Receiver) buffer of the RC (or of the respective EP). For example, the PCIe® VDM message may comprise information on a buffer status, e.g. on a buffer status of a RX and/or TX buffer of the RC, and/or on a buffer status of a RX and/or TX buffer of the gateway device (e.g. of a processor, such as the network processor or video processor of the gateway device). For example, as further shown in FIG. 4b, in bits [23:16] of the fourth group of bytes, the PCIe VDM message may include a Buffer Status, which can comprise, for example, at bit 16 the Tx buffer health level, at bit 17 the Tx buffer over threshold, at bit 18 the Rx buffer health level, at bit 19 the Rx buffer over threshold, and at bits [23:20] a descriptor for the buffer status. For example, the information on the buffer status may indicate, whether the TX and/or RX buffer of the RC or of the gateway device is above an upper buffer threshold (i.e. too full), or below a lower buffer threshold (i.e. too empty). The EP may adapt their data transmissions accordingly, e.g. to avoid overwhelming or underutilizing the buffer of the RC or gateway device.

In some examples, the RC might not only be capable of generating VDM messages, but also of relaying messages that it receives from the EP. Accordingly, the one or more processors may be configured to process (e.g. receive and process) a PCIe® VDM message from another EP of the PCIe® system (e.g. not the EP that the PCIe® VDM message generated by the RC is generated for), or from the EP that the DM generated by the RC is generated for. The one or more processors may be configured to relay (e.g. forward) the PCIe® VDM message received from the other EP to the EP (or to another EP). Accordingly, the PCIe® VDM message received from the other EP may comprise an identifier of the EP (or of another EP) as destination identifier, and the one or more processors may be configured to relay or forward the PCIe® VDM message to the EP or to another EP based on the destination identifier. If the PCIe® VDM message is intended for the RC (as destination), the PCIe® VDM message may comprise an identifier of the RC as destination identifier.

The interface 16 may correspond to one or more inputs and/or outputs for receiving and/or transmitting information, which may be in digital (bit) values according to a specified code, within a module, between modules or between modules of different entities. For example, the interface 16 may comprise interface circuitry configured to receive and/or transmit information. In examples the one or more processors 14 may be implemented using one or more processing units, one or more processing devices, any means for processing, such as a processor, a computer or a programmable hardware component being operable with accordingly adapted software. In other words, the described function of the one or more processors 14 may as well be implemented in software, which is then executed on one or more programmable hardware components. Such hardware components may comprise a general-purpose processor, a Digital Signal Processor (DSP), a micro-controller, etc. For example, the memory 12 may comprise machine-readable and writeable memory, e.g. volatile memory such as Random-Access Memory (RAM) or a volatile memory register, or non-volatile memory, such as flash memory.

More details and aspects of the apparatus, the EP, the RC, the PCIe® system and/or the gateway device are mentioned in connection with the proposed concept or one or more examples described above or below (e.g. FIG. 1a, 1c to 4b). The apparatus, the EP, the RC, the PCIe® system and/or the gateway device may comprise one or more additional optional features corresponding to one or more aspects of the proposed concept or one or more examples described above or below.

FIG. 1b shows another example of an apparatus configured for the RC of the PCIe® system 1000. The one or more processors 14 of the apparatus 10 of FIG. 1b are configured to process a PCIe® VDM message from an EP 200 of the PCIe® system. As has been introduced in connection with FIG. 1a, RC, or rather the one or more processors of the apparatus 10 for the RC, may be configured to receive PCIe® VDM messages from an EP and relay it them to another EP. In some examples, e.g. in the examples shown in connection with FIG. 1b, the one or more processor might also be configured to process the received EP for use at the RC. For example, some of the status information that can be communicated from the RC to the EP, may also be communicated from the EP to the RC. For example, the PCIe®

VDM message may comprise at least one of a data path status at the EP, a reset status at the EP and a buffer status at the EP. For example, the data path status at the EP, the reset status at the EP and the buffer status at the EP may be implemented similar to the data path status at the RC or gateway device, the reset status at the RC or gateway device and the buffer status at the RC or gateway device.

For example, the data path status at the EP may indicate the state of the data path being provided by the EP. For example, if the PCIe® system is a PCIe® system of a gateway device, the EP may be an EP for providing a data path for the Gateway Device. For example, the EP may be one of an EP for providing WiFi/WLAN functionality, an EP for providing LAN functionality, and an EP for providing a WAN functionality. Accordingly, the data path status at the EP may indicate the state of the data path being provided by the EP, e.g. a linkup state (indicating whether a link (on the data path) is available), a link table state (indicating whether the link is stable), and/or a link speed encoding (indicating a link speed provided by the link).

As has been pointed out before, the data path status of the EP may indicate the status of the data path provided by the EP. For example, one of the data paths being provided by an EP may be the WAN data path. Accordingly, the data path status of the EP may comprise information on the WAN data path, such as a link speed of the WAN data path. In some examples, the RC may adjust its behavior when the WAN data path has a low link speed, e.g. a link speed that is lower than a threshold. For example, the PCIe® VDM message may comprise an indication that a WAN link (provided by the EP) is slower than a threshold rate. In this case, the RC can adapt the data throughput to the EP, to avoid overwhelming the WAN link provided by the EP. For example, the one or more processors may be further configured to reduce a data path throughput for the EP based on the indication that a WAN link is slower than a threshold rate. For example, the threshold rate may be dynamic, and may be updated by the respective EP. For example, the threshold may be at a percentage of the average data rate of the WAN link, e.g. at 80% of the average data rate of the WAN link.

To further preserve energy at the RC, the one or more processors may be configured to scale to a virtual function of the SoC of the RC. In other words, the one or more processors may be further configured to scale down a virtual function based on the indication that a WAN link is slower than a threshold rate. In a PCIe® system, there are two types of functions, physical functions, which have full access to the PCIe® system and its configurations, and virtual functions, which are usually based on an underlying physical function, and often (only) have to capability of transmitting data vie the PCIe® system or receiving data via the PCIe® system. By scaling down a virtual function, its data throughput may be capped (e.g. according to the rate supported by the WAN link).

The reset status at the EP may indicate the reset state of one or more components of the EP. For example, the reset status at the EP may indicate the reset state of one or more of the following components of the EP—a DMA (Direct Memory Access) component, a Media Access Control component of the Digital Front End (MAC(DFE)), an Analog Front End (AFE) component and a Line Driver (LD) component.

The buffer status at the EP may indicate the status of a RX buffer and/or of a TX buffer of the EP. For example, the buffer status at the EP may indicate, whether the RX buffer and/of the TX buffer of the EP is underutilized or overwhelmed (or in between). As previously described in connection with the buffer state at the RC, and shown in FIG. 4b, in bits [23:16] of the fourth group of bytes, the PCIe® VDM message may include a Buffer Status, which can comprise, for example, at bit 16 the Tx buffer health level, at bit 17 the Tx buffer over threshold, at bit 18 the Rx buffer health level, at bit 19 the Rx buffer over threshold, and at bits [23:20] a descriptor for the buffer status.

More details and aspects of the apparatus, the EP, the RC, the PCIe® system and/or the gateway device are mentioned in connection with the proposed concept or one or more examples described above or below (e.g. FIG. 1a, 1c to 4b). The apparatus, the EP, the RC, the PCIe® system and/or the gateway device may comprise one or more additional optional features corresponding to one or more aspects of the proposed concept or one or more examples described above or below.

FIG. 1c shows another example of an apparatus configured for a RC 100 of a PCIe® system 1000. For example, the processing circuitry may be configured to provide the functionality of the apparatuses according to the examples of FIGS. 1a and 1b. In other words, the apparatus of FIG. 1e may combine the functionality of the apparatuses shown in FIGS. 1a and 1b.

More details and aspects of the apparatus, the EP, the RC, the PCIe® system and/or the gateway device are mentioned in connection with the proposed concept or one or more examples described above or below (e.g. FIG. 1a to 1b, 1d to 4b). The apparatus, the EP, the RC, the PCIe® system and/or the gateway device may comprise one or more additional optional features corresponding to one or more aspects of the proposed concept or one or more examples described above or below.

Figure 1D:
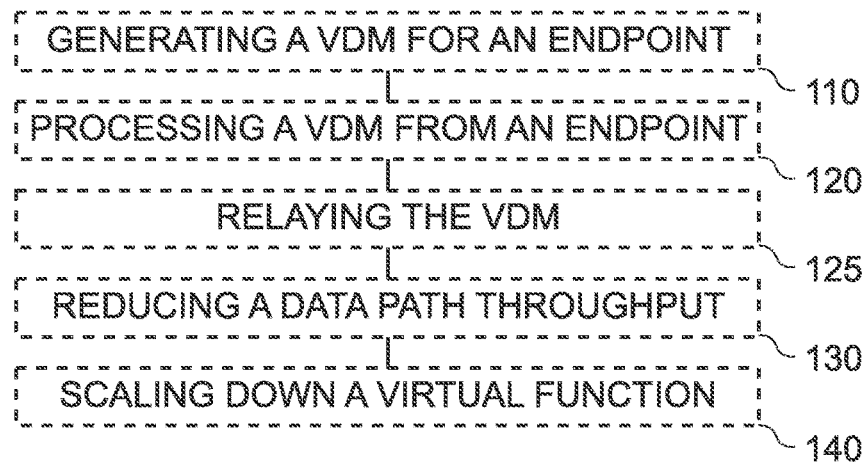
FIG. 1d shows a flow chart of an example of a method for a RC of a PCIe® system.

FIG. 1d shows a flow chart of an example of a method for a RC 100 of a PCIe® system 1000. In FIG. 1d, various features of the method are shown, which may correspond to the features of the examples of the apparatus of claims 1a to 1c. Accordingly, a subset of the features shown in the following may be part of the method, according to the subset of features implemented by the apparatuses of FIGS. 1a to 1c. The method may comprise generating 110 a PCIe® VDM message for an EP 200 of the PCIe® system. The method may comprise processing 120 a PCIe® VDM from an EP 200 of the PCIe® system, e.g. from the same EP or from another EP. For example, if the VDM is received from the other EP, the VDM may be received via an interconnect fabric and another RC that is associated with the other EP. The method may comprise relaying 125 the PCIe® VDM message received from the other EP to the EP. The method may comprise reducing 130 a data path throughput for the EP based on the indication that a WAN link is slower than a threshold rate. The method may comprise scaling 140 down a virtual function based on the indication that a WAN link is slower than a threshold rate.

More details and aspects of the method are mentioned in connection with the proposed concept or one or more examples described above or below (e.g. FIG. 1a to 1c, 1e to 4b). The method may comprise one or more additional optional features corresponding to one or more aspects of the proposed concept or one or more examples described above or below.

Figure 1E:
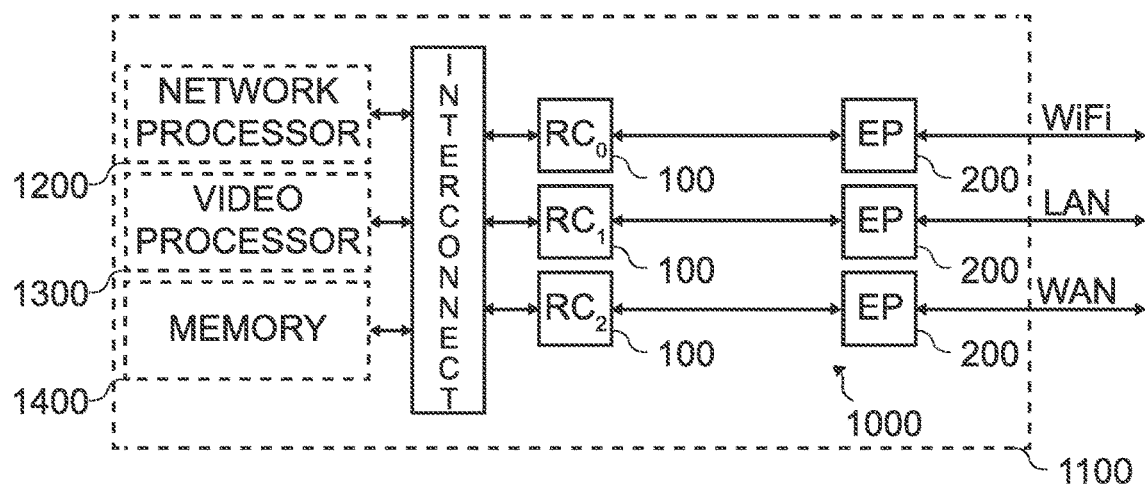
FIG. 1e shows a block diagram of an example of a gateway device.

FIG. 1e shows a block diagram of an example of a gateway device 1100 comprising the PCIe® system (with three RCs 100 RCo, RC1 and RC2 (each comprising the apparatus 10), the RCs being connected via an interconnect fabric, and one or more EPs 200 (e.g. with the apparatus 20)). For example, the gateway device may be a modem or router, e.g. an xDSL (x Digital Subscriber Line, with x denoting different DSL standards or implementations) modem or router, a xPON (x Passive Optical Network, with x denoting different PON standards or implementations, a cable modem or router, a DOCSIS (Data Over Cable Service Interface Specification, a cable communication standard) modem or router etc. The gateway device may further comprise a network processor 1200, a video processor 1300 and/or memory 1400, which may be linked to the EPs providing communication paths (in the example of FIG. 1e: WiFi, LAN and WAN, but other combinations are also feasible) via the interconnect fabric and the RCs of the PCIe® system 1000.

More details and aspects of the gateway device are mentioned in connection with the proposed concept or one or more examples described above or below (e.g. FIG. 1a to 1d, 2a to 4b). The gateway device may comprise one or more additional optional features corresponding to one or more aspects of the proposed concept or one or more examples described above or below.

Figure 2D:
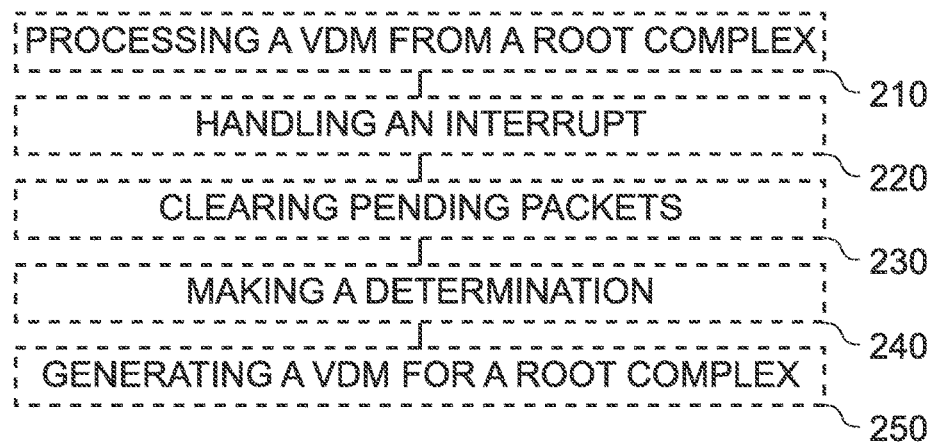
FIG. 2d shows a flow chart of an example of a method for an EP of a PCIe® system.
Figure 2A:
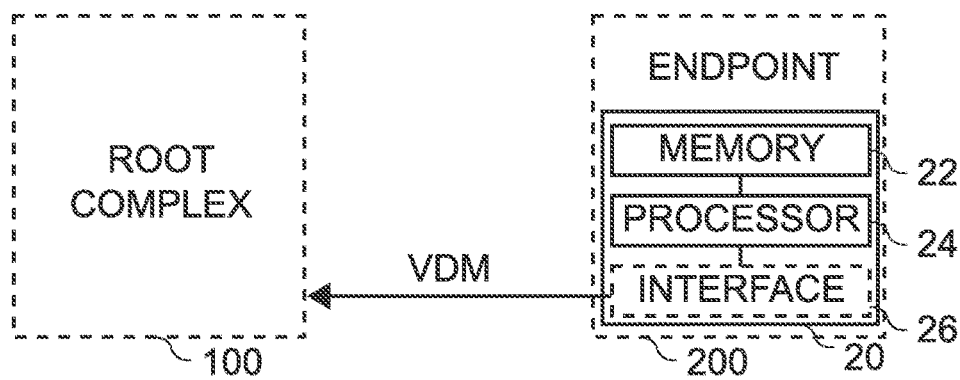
FIGS. 2a to 2c show block diagrams of examples of an apparatus configured for an Endpoint (EP) of a PCIe® system.
Figure 2B:
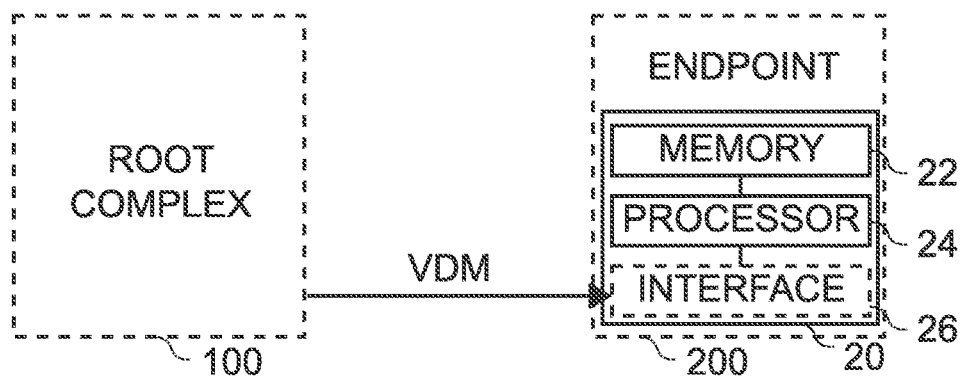
Figure 2C:
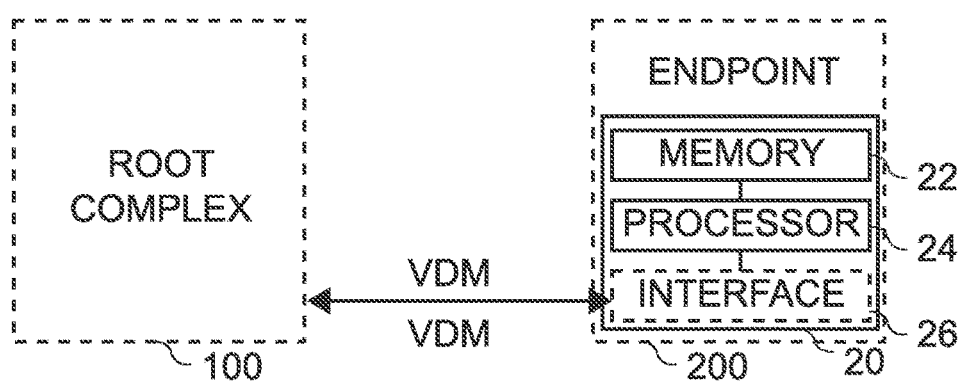

FIGS. 2a to 2c show block diagrams of examples of an apparatus 20 configured for (i.e. suitable for, or configured to provide functionality for) an endpoint EP 200 of a PCIe® system 1000. FIGS. 2a to 2c further show the EP 200 comprising the respective apparatus 20. FIGS. 1a to 1e further show block diagrams of examples of a device 20 configured for the EP 200 of the PCIe® system 1000. The components of the device 20 are defined as component means, which correspond to the respective structural components of the apparatus 20. The apparatus 20 comprises a memory 22 (i.e. memory means) and one or more processors 24 (i.e. processing means). Optionally, the apparatus 10 further comprises an interface 12 (i.e. communication means), e.g. an interface for communicating with the EP, and/or for communicating with an RC via the EP. The one or more processors are coupled to the memory 22 and/or to the interface 26. The functionality provided by the examples of the apparatus may differ. FIGS. 2a to 2c further show the PCIe® system comprising the RC 100 and the EP 200 (with the apparatus 20).

While examples shown in connection with FIGS. 1a to 1d primarily relate to the RC and its interactions with one or more EPs, the examples shown in connection with FIGS. 2a to 2d relate to the EP, and to the apparatus providing the PCIe® VDM message processing functionality for the EP. A gateway device may comprise one or more of such EPs, with the corresponding apparatuses 20.

FIG. 2a shows an example of an apparatus configured for an endpoint EP 200 of a PCIe® system 1000. The one or more processors of the apparatus of FIG. 2a are configured to process a PCIe® VDM message from a RC Root Complex 100 of the PCIe® system. For example, the PCIe® VDM message may be implemented similar to the PCIe® VDM message that is generated by the apparatus 10 introduced in connection with FIGS. 1a to 1e. In other words, the PCIe® VDM message being processed by the BP/apparatus 20 may be generated by the RC. Alternatively, the PCIe® VDM message being processed by the EP/apparatus 20 may be generated by another BP, and relayed by the RC or RCs that are arranged between the EPs. In other words, the PCIe® VDM message may be a PCIe® VDM message from another EP that is relayed by the RC.

For example, as shown in connection with FIG. 1a, the PCIe® VDM message may comprise an interrupt trigger for the EP of the PCIe® system. In general, an interrupt trigger is an information that causes the recipient of the interrupt to trigger an interrupt, i.e. a switch of the context of the processor of the recipient to a context for handling the interrupt. For example, interrupts are often used to notify the recipient of an arrival of a message, to cause the recipient to receive or read out the message from a buffer. But also other interrupts may be used, such as interrupts that notify the EP to retrieve an updated version of a configuration, or to change an energy saving setting of the respective EP. The one or more processors may be further configured to handle an associated interrupt based on the interrupt trigger. For example, the one or more processors may be configured to handle the interrupts themselves, or to provide the interrupt to a processor/SoC of the EP.

In various examples, the PCIe® VDM message may comprise information on a reset status at the RC. For example, the PCIe® VDM message may comprise a notification that the RC is resetting. In this case, the EP may take measures to mitigate the resetting of the RC. For example, the one or more processors may be further configured to clear pending packets in an internal FIFO (First In First Out Buffer) of the EP of the PCIe® system in response to the notification that the RC is resetting, as the communication via the PCIe® system might be temporarily unavailable. After the reset status at the RC indicates, that the RC is reset, the communication with the RC may be re-initiated.

A reset of the RC is often preceded by an error at the RC, e.g. an error that can (only) be mitigated by resetting the RC. For example, the PCIe® VDM message may comprise information on an error at the RC. This information on the error at the RC may be used to prepare the EP for an upcoming reset of the EC. For example, the PCIe® VDM message may comprise an indication of a fatal error at the RC of the PCIe® system (i.e. a "dying gasp" of the RC). In this case, the EP has two options—either a PCIe® subsystem of the EP (which may be implemented by the apparatus 20) may be reset, or the entire EP may be reset. Accordingly, the one or more processors may be further configured to make a determination, based at least in part on the indication of the fatal error, whether to perform a full system reset (of the EP) or to perform a PCIe® module reset (e.g. of the PCIe® module of the EP). For example, depending on the type of the error indicated by the information on the error at the RC, either the full system reset or the PCIe® module reset may be performed.

In various examples, the PCIe® VDM message comprises information on a status of a data path, e.g. of a data path provided by another (or incidentally the same) EP of the PCIe® system. The PCIe® VDM message may further comprise information on a buffer status at the RC or at the gateway device (e.g. the network processor of the gateway device).

The interface 26 may correspond to one or more inputs and/or outputs for receiving and/or transmitting information, which may be in digital (bit) values according to a specified code, within a module, between modules or between modules of different entities. For example, the interface 26 may comprise interface circuitry configured to receive and/or transmit information. In examples the one or more processors 24 may be implemented using one or more processing units, one or more processing devices, any means for processing, such as a processor, a computer or a programmable hardware component being operable with accordingly adapted software. In other words, the described function of the one or more processors 24 may as well be implemented in software, which is then executed on one or more programmable hardware components. Such hardware components may comprise a general-purpose processor, a Digital Signal Processor (DSP), a micro-controller, etc. For example, the memory 22 may comprise machine-readable and writeable memory, e.g. volatile memory such as Random-Access Memory (RAM) or a volatile memory register, or non-volatile memory, such as flash memory.

More details and aspects of the apparatus, the EP, the PCIe® system and/or the gateway device are mentioned in connection with the proposed concept or one or more examples described above or below (e.g. FIG. 1a to 1e, 2b to 4b). The method may comprise one or more additional optional features corresponding to one or more aspects of the proposed concept or one or more examples described above or below.

FIG. 2b shows another example of an apparatus configured for an endpoint EP 200 of a PCIe® system 1000. The one or more processors of the apparatus of FIG. 2a are configured to generate a PCIe® VDM message for a RC Root Complex of the PCIe® system. For example, the PCIe® VDM message that is generated by the one or more processors may be the PCIe® VDM message that is processed by the one or more processors of the apparatus 10 of FIGS. 1a to 1e.

For example, the PCIe® VDM message comprises at least one of a data path status at the EP, a reset status at the EP and a buffer status at the EP. Accordingly, the one or more processors may be configured to determine at least one of the data path status at (i.e. of) the EP, the reset status at (i.e. of) the EP and a buffer status at (i.e. of) the EP. For example, the one or more processors may obtain information at least one of the data path status at (i.e. of) the EP, the reset status at (i.e. of) the EP and a buffer status at (i.e. of) the EP from a processors/SoC of the EP, and determine at least one of the data path status at (i.e. of) the EP, the reset status at (i.e. of) the EP and a buffer status at (i.e. of) the EP based on the information obtained from the processor or SoC of the EP.

In some examples, the EP may be configured to provide the WAN data path of the gateway device. The PCIe® VDM message may comprise an indication that (or whether) the WAN link is slower than a threshold rate. Accordingly, the one or more processors may be configured to determine whether (or that) the WAN link is slower than the threshold rate, and include the respective information in the PCIe® VDM message. For example, the one or more processors may be further configured to set the threshold rate, e.g. as a percentage of an average data rate of the WAN link, e.g. 60% or 80% of the average data rate of the WAN link.

More details and aspects of the apparatus, the EP, the PCIe® system and/or the gateway device are mentioned in connection with the proposed concept or one or more examples described above or below (e.g. FIG. 1a to 2a, 2c to 4b). The method may comprise one or more additional optional features corresponding to one or more aspects of the proposed concept or one or more examples described above or below.

FIG. 2c shows another example of an apparatus configured for an endpoint EP 200 of a PCIe® system 1000. For example, the processing circuitry may be configured to provide the functionality of the apparatuses according to the examples of FIGS. 2a and 2b. In other words, the apparatus of FIG. 2c may combine the functionality of the apparatuses shown in FIGS. 2a and 2b.

More details and aspects of the apparatus, the EP, the PCIe® system and/or the gateway device are mentioned in connection with the proposed concept or one or more examples described above or below (e.g. FIG. 1a to 2b, 2d to 4b). The method may comprise one or more additional optional features corresponding to one or more aspects of the proposed concept or one or more examples described above or below.

FIG. 2d shows a block diagram of an example of a method for an endpoint EP 200 of a PCIe® system 1000. In FIG. 2d, various features of the method are shown, which may correspond to the features of the examples of the apparatus of claims 2a to 2c. Accordingly, a subset of the features shown in the following may be part of the method, according to the subset of features implemented by the apparatuses of FIGS. 2a to 2c. The method may comprise processing 210 a PCIe® VDM message from a RC 100 of the PCIe® system. The method may comprise handling 220 an associated interrupt based on an interrupt trigger. The method may comprise clearing 230 pending packets in an internal FIFO of the EP of the PCIe system in response to a notification that the RC is resetting. The method may comprise making a determination 240, based at least in part on an indication of a fatal error, whether to perform a full system reset or to perform a PCIe® module reset. The method may comprise generating 250 a PCIe® VDM message for the RC of the PCIe® system.

More details and aspects of the method are mentioned in connection with the proposed concept or one or more examples described above or below (e.g. FIG. 1a to 2c, 3 to 4b). The method may comprise one or more additional optional features corresponding to one or more aspects of the proposed concept or one or more examples described above or below.

Figure 3:
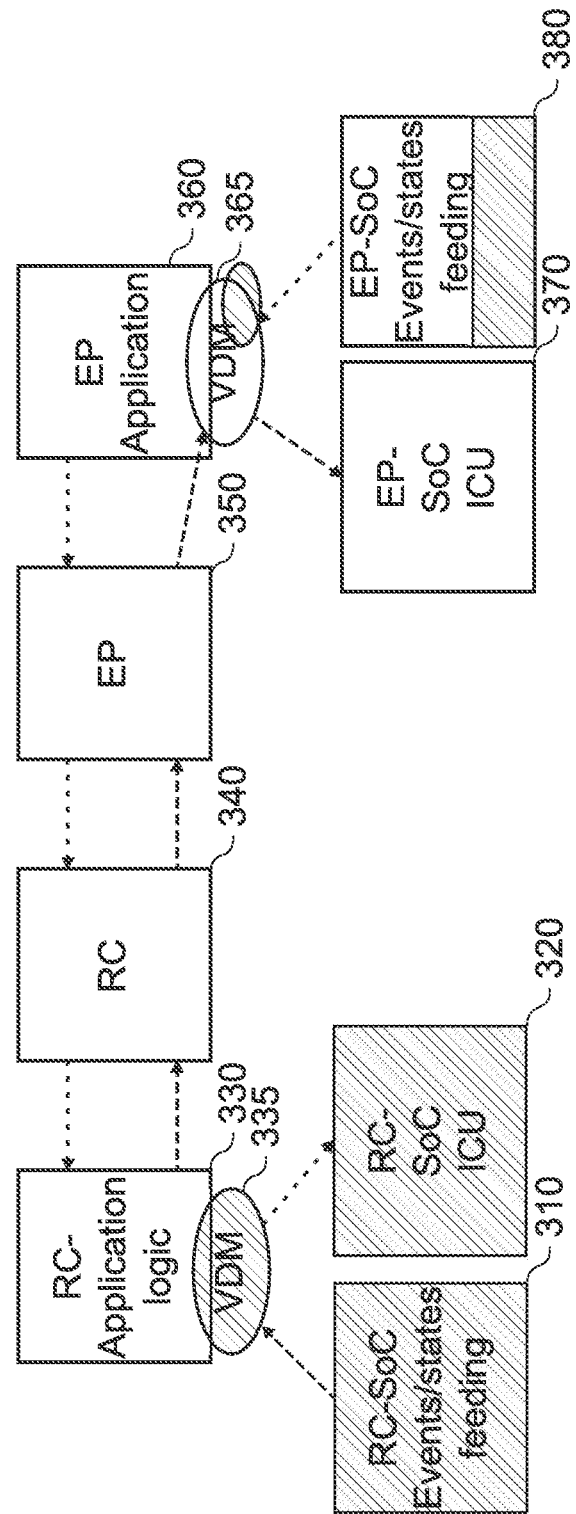
FIG. 3 shows a diagram showing hardware blocks and associated signaling for enhanced VDM (Vendor Designed Message) messaging.

Referring to FIG. 3 illustrated is a diagram showing hardware blocks and associated signaling for enhanced VDM messaging, according to various aspects discussed herein. FIG. 3 may show Root Complex and Endpoint Hardware interactions related to enhanced VDM signaling, according to various examples.

In FIG. 3, the blocks without hatching (blocks 330, 340, 350, 360, 370, portions of 365 and 380), and the majority of the path with the less dense dash pattern (direction EP to RC) indicate a signaling path used by existing systems with PCIe® interconnection: EP device(s) 350 send a message or a message encoded interrupt to the RC 340, the RC receives the notification and retrieves the message or handles the interrupt. Some portions of the path with the less dense dash pattern indicate extensions or modifications of this messaging path based on aspects of various examples discussed herein.

In FIG. 3, the blocks with hatching (310, 320, 335, portions of 365 and 380) and the path with the denser dash pattern (direction RC to EP) indicate added functionality employed by various examples discussed herein. These aspects can be added in various examples to achieve symmetric communications by allowing RC to send message and interrupts to the EP side. These added functionalities can comprise, but are not limited to, RC-SoC Events/states feeding 310, which can be used to generate VDM messages 335 that can be sent from RC to EP via RC-Application logic 330, RC 340, EP 350, and BP-Application logic 360 to EP-SoC ICU (Interrupt Control Unit) 370. Additionally, functionality related to VDM messaging can be expanded at the EP side to facilitate VDM messaging 365 based on EP-SoC Events/states feeding 380 from EP to RC via EP-application logic 360, EP 350, RC 340, RC-Application logic 330, to RC-SoC ICU 320. For example, the apparatus 10 of FIGS. 1a to 1e may implement one or more of blocks 310, 320, 330 and 335. Apparatus 20 of FIGS. 2a to 2c may implement one or more of blocks 360, 365, 370 and 380.

Referring to FIGS. 4a and 4b, illustrated is an example message format and system event definitions that can be employed for two-way messaging via enhanced VDM messaging in a PCIe® system, according to various aspects discussed herein. FIG. 4a shows a schematic diagram of an example of a header for VDM messages, as specified by the PCIe® 3.0 specification. FIG. 4a shows one possible example header for VDM messages that can be employed by various examples discussed herein. In various examples, additional or alternative information can be communicated via VDM message headers. For example, the header may be implemented similar to the VDM message header used in PCIe® standard 3.0 (and later). Each row of the header comprise four bytes, with the first row below the bit counter starts from byte 0, the second row starts from byte 4, the third row starts from byte 8 and the fourth row starts from byte 12 (for a total of 16 bytes). Bytes 0 to 4 comprise the fields present in (all) Translation Layer Packet (TLP) headers. Byte 0 comprises the Fmt[2:0]—the Format of TLP, and Type[4:0]—Type of TLP. Byte 1 comprises a reserved bit at bit 7, TC[2:0]-Traffic Class at bits [6:4], a reserved bit at bit 3, an Attr[2]—attribute bit at bit 2, a reserved bit at bit 1 and a TH bit at bit 0, which indicates the presence of TLP processing hints. Byte 2 comprises a TD bit at bit 7, which indicates the presence of a TLP digest, an EP bit at bit 6, which indicates that the TLP is poisoned, Attr[1:0]-Attributes at bits [5:4], and an AT [1:0] field at bits [3:2]. Furthermore, from bit 2 of byte 2 to bit 0 of byte 3, a length field [9:0] is included, which indicates the length of the data payload. The Requester ID of bytes 4 and 5 is implementation specific. Byte 6 comprises a Tag of the message, Byte 7 a vendor-defined message code. If the Route by ID (Identifier) routing of PCIe® is used, bytes 8 and 9 form a 16-bit field for the destination ID, otherwise these bytes are Reserved. Bytes 10 and 11 form a 16-bit field for the Vendor ID, as defined by PCI-SIG®, of the vendor defining the Message. The exemplary table of events and messages of FIG. 4b may be inserted into the fourth row (Bytes 12 to 15), for example (marked "For Vendor Definition").

FIG. 4b shows a table of events and messages that can be communicated via enhanced VDM messaging according to various examples discussed herein. In various examples, these can comprise (but need not be limited to) one or more of the following, along with example bits (which can also vary in some examples) that can be employed for communicating these states, messages, etc.:

[31:24] RC EP, which can comprise:
[31:28] RC to EP interrupt encoding and
[27:24] RC to EP error encoding (optionally comprising dying gasp indication); [23:16] Buffer Status, which can comprise:
16 Tx buffer health level,
17 Tx buffer over threshold,
18 Rx buffer health level,
19 Rx buffer over threshold, and [23:20] for descriptor buffer status;
[15:8] Data Path Status, which can comprise:
[15:12] RC side status encoding, e.g., LAN (Local Area Network)/WiFi (Wireless Fidelity)/Voice/Video port status and
[11:8] EP side status encoding: linkup, link stable, link speed encoding; and [7:0] Reset Communication, which can comprise:
[7:4] RC side reset status: BM (Buffer Manager)/CQM (Central Queue Manager)/PP (Packet Processor)/Host in reset and
[3:0] EP side reset status: DMA (Direct Memory Access)/ .MAC(DFE) (Media Access Control of the Digital Front End)/AFE (Analog Front End)/LD (Line Driver).

Possible example applications and use case for examples discussed herein can comprise, but are not limited to: (1) SoC sub system software Reset synchronization: the RC SoC is resetting and the EP SoC is notified, such that the EP SoC may clear pending packets in internal FIFO;
(2) WAN Link States: the EP SoC informs the RC SoC that the WAN link is very slow (e.g., slower than a threshold link rate), the RC SoC can reduce the data path throughput feeding, which may help to avoid buffer overflow, and the RC SoC side can scale down VF (Virtual Function) to save system power; (3) RC SoC interrupt(s) to EP SoC processor: the RC SoC can send a message to trigger an interrupt for the EP SoC processor to handle; (4) RC SoC fatal error: the RC SoC can report a fetal error to the EP SoC and the EP SoC can determine whether to perform a full subsystem reset or only a PCIe® module reset.

Examples discussed herein have multiple advantages over techniques employed by existing systems. For example, side-band signaling, employed in some existing systems, cannot be used as a solution for a socket and plug-in card structure. Additionally, side band signaling also limits the system events to be communicated, e.g., wherein one signal can indicate one event. Furthermore, side band signaling uses extra pins, leading to a higher cost of implementation.

Techniques employed in various examples discussed herein are flexible and extendable as the message format can be adapted to individual system goals, including new system goals. Additionally, sideband signaling can be omitted.

These techniques and examples can be implemented without changes to the PCIe® specification, thus examples discussed herein can be employed in connection with any PCIe® systems, which can be used as currently employed (unlike with sideband signaling, which requires additional pins). Additionally, unlike existing techniques (e.g., employing sideband signaling), techniques discussed herein and employed in various examples have negligible system overhead, as VDM can use write over PCIe® and interrupt to notify message arrival.

Techniques discussed herein and employed in various examples provide simple yet effective enhancements which can be employed in connection with a variety of PCIe® system architectures to enhance/enforce a system communication mechanism over two (or multiple) sub systems interconnected according to any of a variety of architectures, for example: (1) Network Processor+AnyWAN (xDSL (x Digital Subscriber Line network, with x denoting different DSL standards or implementations), xPON (x Passive Optical Network, with x denoting different PON standards or implementations), DOCSIS (Data Over Cable Service Interface Specification, a cable communication standard), . . . ) over PCIe®; (2) Network Processor+WiFi over PCIe®; (3) Network Processor+Video Processor over PCIe®; etc.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to examples and examples described.

The aspects and features mentioned and described together with one or more of the previously detailed examples and figures, may as well be combined with one or more of the other examples in order to replace a like feature of the other example or in order to additionally introduce the feature to the other example.

Example 1 relates to an apparatus (10) configured for a Root Complex (RC) (100) of a PCIe® (Peripheral Component Interconnect express) system (1000), comprising a memory (12). The apparatus (10) comprises one or more processors (14) configured to generate a PCIe® VDM (Vendor Defined Message) message for an EP (Endpoint) (200) of the PCIe® system.

In Example 2, the subject matter of example 1 or any of the Examples described herein may further include, that the PCIe® VDM message comprises an interrupt trigger for the EP of the PCIe® system.

In Example 3, the subject matter of one of the examples 1 to 2 or any of the Examples described herein may further include, that the PCIe® VDM message comprises information on an error at the RC.

In Example 4, the subject matter of example 3 or any of the Examples described herein may further include, that the PCIe® VDM message comprises an indication of a fatal error at the RC of the PCIe® system.

In Example 5, the subject matter of one of the examples 1 to 4 or any of the Examples described herein may further include, that the PCIe® VDM message comprises information on a reset status at the RC.

In Example 6, the subject matter of example 5 or any of the Examples described herein may further include, that the PCIe® VDM message comprises a notification that the RC of the PCIe® system is resetting.

In Example 7, the subject matter of one of the examples 1 to 6 or any of the Examples described herein may further include, that the PCIe® VDM message comprises information on a status of at least one data path.

In Example 8, the subject matter of one of the examples 1 to 7 or any of the Examples described herein may further include, that the PCIe® VDM message comprises information on a buffer status.

In Example 9, the subject matter of one of the examples 1 to 8 or any of the Examples described herein may further include, that the one or more processors are configured to process a PCIe® VDM message from another EP of the PCIe® system, and to relay the PCIe® VDM message received from the other EP to the EP.

Example 10 relates to an apparatus (20) configured for an Endpoint (EP) (200) of a PCIe® (Peripheral Component Interconnect express) system (1000), comprising a memory (22). The apparatus (20) comprises one or more processors (24) configured to process a PCIe® (Peripheral Component Interconnect express) VDM (Vendor Defined Message) message from a RC (Root Complex) (100) of the PCIe® system.

In Example 11, the subject matter of example 10 or any of the Examples described herein may further include, that the PCIe® VDM message comprises an interrupt trigger for the EP of the PCIe® system.

In Example 12, the subject matter of example 11 or any of the Examples described herein may further include, that the one or more processors are further configured to handle an associated interrupt based on the interrupt trigger.

In Example 13, the subject matter of one of the examples 10 to 12 or any of the Examples described herein may further include, that the PCIe® VDM message comprises information on a reset status at the RC.

In Example 14, the subject matter of example 13 or any of the Examples described herein may further include, that the PCIe® VDM message comprises a notification that the RC is resetting.

In Example 15, the subject matter of example 14 or any of the Examples described herein may further include, that the one or more processors are further configured to clear pending packets in an internal FIFO (First In First Out) of the EP of the PCIe® system in response to the notification that the RC is resetting.

In Example 16, the subject matter of one of the examples 10 to 15 or any of the Examples described herein may further include, that the PCIe® VDM message comprises information on an error at the RC.

In Example 17, the subject matter of one of the examples 10 to 16 or any of the Examples described herein may further include, that the PCIe® VDM message comprises an indication of a fatal error at the RC of the PCIe® system.

In Example 18, the subject matter of example 17 or any of the Examples described herein may further include, that the one or more processors are further configured to make a determination, based at least in part on the indication of the fatal error, whether to perform a full system reset or to perform a PCIe® module reset.

In Example 19, the subject matter of one of the examples 10 to 18 or any of the Examples described herein may further include, that the PCIe® VDM message comprises information on a status of a data path.

In Example 20, the subject matter of one of the examples IO to 19 or any of the Examples described herein may further include, that the PCIe® VDM message comprises information on a buffer status.

In Example 21, the subject matter of one of the examples 10 to 20 or any of the Examples described herein may further include, that the PCIe® VDM message is a PCIe® VDM message from another EP that is relayed by the RC.

Example 22 relates to an apparatus (20) configured for an Endpoint (EP) (200) of a PCIe® (Peripheral Component Interconnect express) system (1000), comprising a memory (22). The apparatus (20) comprises one or more processors (24) configured to generate a PCIe® VDM (Vendor Defined Message) message for a RC (Root Complex) of the PCIe® system.

In Example 23, the subject matter of example 22 or any of the Examples described herein may further include, that the PCIe® VDM message comprises at least one of a data path status at the EP, a reset status at the EP and a buffer status at the EP.

In Example 24, the subject matter of one of the examples 22 to 23 or any of the Examples described herein may further include, that the PCIe® VDM message comprises an indication that a WAN link is slower than a threshold rate.

Example 25 relates to an apparatus (10) configured for a Root Complex (RC) (100) of a PCIe® (Peripheral Component Interconnect express) system (1000), comprising a memory (12). The apparatus (10) comprises one or more processors (14) configured to process a PCIe® VDM (Vendor Defined Message) message from an EP (Endpoint) (200) of the PCIe® system.

In Example 26, the subject matter of example 25 or any of the Examples described herein may further include, that the PCIe® VDM message comprises at least one of a data path status at the EP, a reset status at the EP and a buffer status at the EP.

In Example 27, the subject matter of one of the examples 25 to 26 or any of the Examples described herein may further include, that the PCIe® VDM message comprises an indication that a WAN link is slower than a threshold rate.

In Example 28, the subject matter of example 27 or any of the Examples described herein may further include, that the one or more processors are further configured to reduce a data path throughput for the EP based on the indication that a WAN link is slower than a threshold rate.

In Example 29, the subject matter of one of the examples 27 to 28 or any of the Examples described herein may further include, that the one or more processors are further configured to scale down a virtual function based on the indication that a WAN link is slower than a threshold rate.

Example 30 relates to an apparatus comprising means for executing any of the described operations of any of the examples 1 to 29.

Example 31 relates to a machine readable medium that stores instructions for execution by a processor to perform any of the described operations of any of the examples 1 to 29.

Example 32 relates to an apparatus comprising a memory interface. The apparatus comprises processing circuitry configured to perform any of the described operations of any of the examples 1 to 29.

Example 33 relates to a device (10) configured for a Root Complex (RC) (100) of a PCIe® (Peripheral Component Interconnect express) system (1000), comprising memory means (12). The device (10) comprises processing means (14) configured to generate a PCIe® VDM (Vendor Defined Message) message for an EP (Endpoint) (200) of the PCIe® system.

In Example 34, the subject matter of example 33 or any of the Examples described herein may further include, that the PCIe® VDM message comprises an interrupt trigger for the EP of the PCIe® system.

In Example 35, the subject matter of one of the examples 33 to 34 or any of the Examples described herein may further include, that the PCIe® VDM message comprises information on an error at the RC.

In Example 36, the subject matter of example 35 or any of the Examples described herein may further include, that the PCIe® VDM message comprises an indication of a fatal error at the RC of the PCIe® system.

In Example 37, the subject matter of one of the examples 33 to 36 or any of the Examples described herein may further include, that the PCIe® VDM message comprises information on a reset status at the RC.

In Example 38, the subject matter of example 37 or any of the Examples described herein may further include, that the PCIe® VDM message comprises a notification that the RC of the PCIe® system is resetting.

In Example 39, the subject matter of one of the examples 33 to 38 or any of the Examples described herein may further include, that the PCIe® VDM message comprises information on a status of at least one data path.

In Example 40, the subject matter of one of the examples 33 to 39 or any of the Examples described herein may further include, that the PCIe® VDM message comprises information on a buffer status.

In Example 41, the subject matter of one of the examples 33 to 40 or any of the Examples described herein may further include, that the processing means is configured to process a PCIe® VDM message from another EP of the PCIe® system, and to relay the PCIe® VDM message received from the other EP to the EP.

Example 42 relates to a device (20) configured for an Endpoint (EP) (200) of a PCIe® (Peripheral Component Interconnect express) system (1000), comprising memory means (22). The device (20) comprises processing means (24) configured to process a PCIe® (Peripheral Component Interconnect express) VDM (Vendor Defined Message) message from a RC (Root Complex) (100) of the PCIe® system.

In Example 43, the subject matter of example 42 or any of the Examples described herein may further include, that the PCIe® VDM message comprises an interrupt trigger for the EP of the PCIe® system.

In Example 44, the subject matter of example 43 or any of the Examples described herein may further include, that the processing means is further configured to handle an associated interrupt based on the interrupt trigger.

In Example 45, the subject matter of one of the examples 42 to 44 or any of the Examples described herein may further include, that the PCIe® VDM message comprises information on a reset status at the RC.

In Example 46, the subject matter of example 45 or any of the Examples described herein may further include, that the PCIe® VDM message comprises a notification that the RC is resetting.

In Example 47, the subject matter of example 46 or any of the Examples described herein may further include, that the processing means is further configured to clear pending packets in an internal FIFO (First In First Out) of the EP of the PCIe® system in response to the notification that the RC is resetting.

In Example 48, the subject matter of one of the examples 42 to 47 or any of the Examples described herein may further include, that the PCIe® VDM message comprises information on an error at the RC.

In Example 49, the subject matter of one of the examples 42 to 48 or any of the Examples described herein may further include, that the PCIe® VDM message comprises an indication of a fatal error at the RC of the PCIe® system.

In Example 50, the subject matter of example 49 or any of the Examples described herein may further include, that the processing means is further configured to make a determination, based at least in part on the indication of the fatal error, whether to perform a full system reset or to perform a PCIe® module reset.

In Example 51, the subject matter of one of the examples 42 to 50 or any of the Examples described herein may further include, that the PCIe® VDM message comprises information on a status of a data path.

In Example 52, the subject matter of one of the examples 42 to 51 or any of the Examples described herein may further include, that the PCIe® VDM message comprises information on a buffer status.

In Example 53, the subject matter of one of the examples 42 to 52 or any of the Examples described herein may further include, that the PCIe® VDM message is a PCIe® VDM message from another EP that is relayed by the RC.

Example 54 relates to a device (20) configured for an Endpoint (EP) (200) of a PCIe® (Peripheral Component Interconnect express) system (1000), comprising memory means (22). The device (20) comprises processing means (24) configured to generate a PCIe® VDM (Vendor Defined Message) message for a RC (Root Complex) of the PCIe® system.

In Example 55, the subject matter of example 54 or any of the Examples described herein may further include, that the PCIe® VDM message comprises at least one of a data path status at the EP, a reset status at the EP and a buffer status at the EP.

In Example 56, the subject matter of one of the examples 54 to 55 or any of the Examples described herein may further include, that the PCIe® VDM message comprises an indication that a WAN link is slower than a threshold rate.

Example 57 relates to a device (10) configured for a Root Complex (RC) (100) of a PCIe® (Peripheral Component Interconnect express) system (1000), comprising memory means (12). The device (10) comprises processing means (14) configured to process a PCIe® VDM (Vendor Defined Message) message from an EP (Endpoint) (200) of the PCIe® system.

In Example 58, the subject matter of example 57 or any of the Examples described herein may further include, that the PCIe® VDM message comprises at least one of a data path status at the EP, a reset status at the EP and a buffer status at the EP.

In Example 59, the subject matter of one of the examples 57 to 58 or any of the Examples described herein may further include, that the PCIe® VDM message comprises an indication that a WAN link is slower than a threshold rate.

In Example 60, the subject matter of example 59 or any of the Examples described herein may further include, that the processing means is further configured to reduce a data path throughput for the EP based on the indication that a WAN link is slower than a threshold rate.

In Example 61, the subject matter of one of the examples 59 to 60 or any of the Examples described herein may further include, that the processing means is further configured to scale down a virtual function based on the indication that a WAN link is slower than a threshold rate.

Example 62 relates to a device comprising means for executing any of the described operations of any of the examples 33 to 61.

Example 63 relates to a machine readable medium that stores instructions for execution by a processor to perform any of the described operations of any of the examples 33 to 61.

Example 64 relates to a device comprising a memory interface. The device comprises processing means configured to perform any of the described operations of any of the examples 33 to 61.

Example 65 relates to a method for a Root Complex (RC) (100) of a PCIe® (Peripheral Component Interconnect express) system (1000), comprising generating (110) a PCIe® VDM (Vendor Defined Message) message for an EP (Endpoint) (200) of the PCIe® system.

In Example 66, the subject matter of example 65 or any of the Examples described herein may further include, that the PCIe® VDM message comprises an interrupt trigger for the EP of the PCIe® system.

In Example 67, the subject matter of one of the examples 65 to 66 or any of the Examples described herein may further include, that the PCIe® VDM message comprises information on an error at the RC.

In Example 68, the subject matter of example 67 or any of the Examples described herein may further include, that the PCIe® VDM message comprises an indication of a fatal error at the RC of the PCIe® system.

In Example 69, the subject matter of one of the examples 65 to 68 or any of the Examples described herein may further include, that the PCIe® VDM message comprises information on a reset status at the RC.

In Example 70, the subject matter of example 69 or any of the Examples described herein may further include, that the PCIe® VDM message comprises a notification that the RC of the PCIe® system is resetting.

In Example 71, the subject matter of one of the examples 65 to 70 or any of the Examples described herein may further include, that the PCIe® VDM message comprises information on a status of at least one data path.

In Example 72, the subject matter of one of the examples 65 to 71 or any of the Examples described herein may further include, that the PCIe® VDM message comprises information on a buffer status.

In Example 73, the subject matter of one of the examples 65 to 72 or any of the Examples described herein may further include, that the method comprises processing (120) a PCIe® VDM message from another EP of the PCIe® system, and relaying (125) the PCIe® VDM message received from the other EP to the EP.

Example 74 relates to a method for an Endpoint (EP) (200) of a PCIe® (Peripheral Component Interconnect express) system (1000), comprising processing (210) a PCIe® (Peripheral Component Interconnect express) VDM (Vendor Defined Message) message from a RC (Root Complex) (100) of the PCIe® system.

In Example 75, the subject matter of example 74 or any of the Examples described herein may further include, that the PCIe® VDM message comprises an interrupt trigger for the EP of the PCIe® system.

In Example 76, the subject matter of example 75 or any of the Examples described herein may further include, that the method further comprises handling (220) an associated interrupt based on the interrupt trigger.

In Example 77, the subject matter of one of the examples 74 to 76 or any of the Examples described herein may further include, that the PCIe® VDM message comprises information on a reset status at the RC.

In Example 78, the subject matter of example 77 or any of the Examples described herein may further include, that the PCIe® VDM message comprises a notification that the RC is resetting.

In Example 79, the subject matter of example 78 or any of the Examples described herein may further include, that the method further comprises clearing (230) pending packets in an internal FIFO (First In First Out) of the EP of the PCIe® system in response to the notification that the RC is resetting.

In Example 80, the subject matter of one of the examples 74 to 79 or any of the Examples described herein may further include, that the PCIe® VDM message comprises information on an error at the RC.

In Example 81, the subject matter of one of the examples 74 to 80 or any of the Examples described herein may further include, that the PCIe® VDM message comprises an indication of a fatal error at the RC of the PCIe® system.

In Example 82, the subject matter of example 81 or any of the Examples described herein may further include, that the method further comprises making a determination (240), based at least in part on the indication of the fatal error, whether to perform a full system reset or to perform a PCIe® module reset.

In Example 83, the subject matter of one of the examples 74 to 82 or any of the Examples described herein may further include, that the PCIe® VDM message comprises information on a status of a data path.

In Example 84, the subject matter of one of the examples 74 to 83 or any of the Examples described herein may further include, that the PCIe® VDM message comprises information on a buffer status.

In Example 85, the subject matter of one of the examples 74 to 84 or any of the Examples described herein may further include, that the PCIe® VDM message is a PCIe® VDM message from another EP that is relayed by the RC.

Example 86 relates to a method (20) for an Endpoint (EP) (200) of a PCIe® (Peripheral Component Interconnect express) system (1000), comprising generating (250) a PCIe® VDM (Vendor Defined Message) message for a RC (Root Complex) of the PCIe® system.

In Example 87, the subject matter of example 86 or any of the Examples described herein may further include, that the PCIe® VDM message comprises at least one of a data path status at the EP, a reset status at the EP and a buffer status at the EP.

In Example 88, the subject matter of one of the examples 86 to 87 or any of the Examples described herein may further include, that the PCIe® VDM message comprises an indication that a WAN link is slower than a threshold rate.

Example 89 relates to a method (10) for a Root Complex (RC) (100) of a PCIe® (Peripheral Component Interconnect express) system (1000), comprising processing (120) a PCIe® VDM (Vendor Defined Message) message from an EP (Endpoint) (200) of the PCIe® system.

In Example 90, the subject matter of example 89 or any of the Examples described herein may further include, that the PCIe® VDM message comprises at least one of a data path status at the EP, a reset status at the EP and a buffer status at the EP.

In Example 91, the subject matter of one of the examples 89 to 90 or any of the Examples described herein may further include, that the PCIe® VDM message comprises an indication that a WAN link is slower than a threshold rate.

In Example 92, the subject matter of example 91 or any of the Examples described herein may further include, that the method further comprises reducing (130) a data path throughput for the EP based on the indication that a WAN link is slower than a threshold rate.

In Example 93, the subject matter of one of the examples 91 to 92 or any of the Examples described herein may further include, that the method further comprises scaling (140) down a virtual function based on the indication that a WAN link is slower than a threshold rate.

Example 94 relates to an apparatus or device comprising means for executing any of the described operations of any of the examples 65 to 93.

Example 95 relates to a machine readable medium that stores instructions for execution by a processor to perform any of the methods of any of the examples 65 to 93.

Example 96 relates to a device comprising a memory interface. The device comprises processing circuitry configured to perform any of the methods of any of the examples 65 to 93.

Example 97 relates to a system comprising the apparatus (10) according to one of the examples 1 to 9 or 25 to 29 and the apparatus (20) according to one of the examples 10 to 24.

Example 98 relates to a system comprising the device (10) according to one of the examples 33 to 41 or 57 to 61 and the device (20) according to one of the examples 42 to 56.

Example 99 relates to a system comprising two devices according to one of the examples 30, 32, 62, 64, 94 or 96.

In Example 100, the subject matter of one of the examples 97 to 99 or any of the Examples described herein may further include, that the system is a gateway device.

Example 101 relates to a machine-readable storage medium including program code, when executed, to cause a machine to perform at least one of the methods of one of the examples 65 to 93.

Example 102 relates to a computer program having a program code for performing at least one of the methods of one of the examples 65 to 93, when the computer program is executed on a computer, a processor, or a programmable hardware component.

Example 103 relates to a machine-readable storage including machine readable instructions, when executed, to implement a method or realize an apparatus as shown in any example and claimed in any pending claim.

Example A1 is an apparatus configured to be employed at a Root Complex (RC) of a PCIe® (Peripheral Component Interconnect express) system, comprising: a memory; and one or more processors configured to: generate a PCIe® VDM (Vendor Defined Message) message for an EP (Endpoint) of the PCIe® system.

Example A2 comprises the subject matter of any variation of any of example(s) A1, wherein the PCIe® VDM message comprises a notification that the RC of the PCIe® system is resetting.

Example A3 comprises the subject matter of any variation of any of example(s) A1, wherein the PCIe® VDM message comprises an interrupt trigger for the EP of the PCIe® system.

Example A4 comprises the subject matter of any variation of any of example(s) A1, wherein the PCIe® VDM message comprises an indication of a fatal error at the RC of the PCIe system.

Example A5 is an apparatus configured to be employed at an Endpoint (EP) of a PCIe® (Peripheral Component Interconnect express) system, comprising: a memory; and one or more processors configured to: process a PCIe® (Peripheral Component Interconnect express) VDM (Vendor Defined Message) message from a RC (Root Complex) of the PCIe® system.

Example A6 comprises the subject matter of any variation of any of example(s) A5, wherein the PCIe® VDM message comprises a notification that the RC is resetting.

Example A7 comprises the subject matter of any variation of any of example(s) A6, wherein the one or more processors are further configured to clear pending packets in an internal FIFO (First In First Out) of the EP of the PCIe® system.

Example A8 comprises the subject matter of any variation of any of example(s) A5, wherein the PCIe® VDM message comprises an interrupt trigger for the EP of the PCIe® system.

Example A9 comprises the subject matter of any variation of any of example(s) A8, wherein the one or more processors are further configured to handle an associated interrupt based on the interrupt trigger.

Example A10 comprises the subject matter of any variation of any of example(s) A5, wherein the PCIe® VDM message comprises an indication of a fatal error at the RC of the PCIe system.

Example A11 comprises the subject matter of any variation of any of example(s) A10, wherein the one or more processors are further configured to make a determination, based at least in part on the indication of the fatal error, whether to perform a full system reset or to perform a PCIe® module reset.

Example A12 is an apparatus configured to be employed at an Endpoint (EP) of a PCIe® (Peripheral Component Interconnect express) system, comprising: a memory; and one or more processors configured to: generate a PCIe® VDM (Vendor Defined Message) message for a RC (Root Complex) of the PCIe® system.

Example A13 comprises the subject matter of any variation of any of example(s) A12, wherein the PCIe® VDM message comprises an indication that a WAN link is slower than a threshold rate.

Example A14 is an apparatus configured to be employed at a Root Complex (RC) of a PCIe® (Peripheral Component Interconnect express) system, comprising: a memory; and one or more processors configured to: process a PCIe® VDM (Vendor Defined Message) message from an EP (Endpoint) of the PCIe® system.

Example A15 comprises the subject matter of any variation of any of example(s) A14, wherein the PCIe® VDM message comprises an indication that a WAN link is slower than a threshold rate.

Example A16 comprises the subject matter of any variation of any of example(s) A15, wherein the one or more processors are further configured to reduce a data path throughput feeding.

Example A17 comprises the subject matter of any variation of any of example(s) A15, wherein the one or more processors are further configured to scale down a VF.

Example A18 comprises an apparatus comprising means for executing any of the described operations of examples A1-A17.

Example A19 comprises a machine readable medium that stores instructions for execution by a processor to perform any of the described operations of examples A1-A17.

Example A20 comprises an apparatus comprising: a memory interface; and processing circuitry configured to: perform any of the described operations of examples A1-A17.

The above description of illustrated examples of the subject disclosure, including what is described in the Abstract and/or the Appendix, is not intended to be exhaustive or to limit the disclosed examples to the precise forms disclosed. While specific examples and examples are described herein for illustrative purposes, various modifications are possible that are considered within the scope of such examples and examples, as those skilled in the relevant art can recognize. In the context of the disclosure, at least some examples may be interpreted as embodiments of the present disclosure.

In this regard, while the disclosed subject matter has been described in connection with various examples and corresponding Figures, where applicable, it is to be understood that other similar examples can be used or modifications and additions can be made to the described examples for performing the same, similar, alternative, or substitute function of the disclosed subject matter without deviating therefrom. Therefore, the disclosed subject matter should not be limited to any single example described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . ." performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus configured for a Root Complex (RC) of a PCIe (Peripheral Component Interconnect express) system, comprising:
   a memory; and
   one or more processors configured to:
   generate a PCIe VDM (Vendor Defined Message) message for an EP (Endpoint) of the PCIe system, wherein the PCIe VDM message comprises at least one of: an interrupt trigger for the EP of the PCIe system, information on a reset status at the RC, information on a status of at least one data path, or information on a buffer status.

2. The apparatus of claim 1, wherein the PCIe VDM message comprises information on an error at the RC.

3. The apparatus of claim 2, wherein the PCIe VDM message comprises an indication of a fatal error at the RC of the PCIe system.

4. The apparatus of claim 1, wherein the PCIe VDM message comprises a notification that the RC of the PCIe system is resetting.

5. The apparatus of claim 1, wherein the one or more processors are configured to process a PCIe VDM message from another EP of the PCIe system, and to relay the PCIe VDM message received from the other EP to the EP.

6. An apparatus configured for an Endpoint (EP) of a PCIe (Peripheral Component Interconnect express) system, comprising:
   a memory; and
   one or more processors configured to:
   process a PCIe (Peripheral Component Interconnect express) VDM (Vendor Defined Message) message from a RC (Root Complex) of the PCIe system, wherein the PCIe VDM message comprises at least one of: an interrupt trigger for the EP of the PCIe system, information on a reset status, information on a status of at least one data path, or information on a buffer status.

7. The apparatus of claim 6, wherein the PCIe VDM message comprises information on an error at the RC.

8. The apparatus of claim 6, wherein the PCIe VDM message is a PCIe VDM message from another EP that is relayed by the RC.

9. An apparatus configured for an Endpoint (EP) of a PCIe (Peripheral Component Interconnect express) system, comprising:
   a memory; and
   one or more processors configured to:
   generate a PCIe VDM (Vendor Defined Message) message for a RC (Root Complex) of the PCIe system, wherein the PCIe VDM message comprises an interrupt trigger for the EP of the PCIe system.

10. The apparatus of claim 9, wherein the PCIe VDM message comprises at least one of a data path status at the EP, a reset status at the EP and a buffer status at the EP.

11. An apparatus configured for a Root Complex (RC) of a PCIe (Peripheral Component Interconnect express) system, comprising:
    a memory; and
    one or more processors configured to:
    process a PCIe VDM (Vendor Defined Message) message from an EP (Endpoint) of the PCIe system, wherein the PCIe VDM message comprises an interrupt trigger for the EP of the PCIe system.

12. The apparatus of claim 11, wherein the PCIe VDM message comprises at least one of a data path status at the EP, a reset status at the EP and a buffer status at the EP.

* * * * *